US012664616B2

(12) United States Patent
Sun et al.

(10) Patent No.: US 12,664,616 B2
(45) Date of Patent: Jun. 23, 2026

(54) IMAGE PROCESSING METHOD, MODEL TRAINING METHOD, APPARATUS, MEDIUM AND DEVICE

(71) Applicant: Beijing Bytedance Network Technology Co., Ltd., Beijing (CN)

(72) Inventors: Jia Sun, Beijing (CN); Zehuan Yuan, Beijing (CN); Changhu Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 172 days.

(21) Appl. No.: 18/252,979

(22) PCT Filed: Nov. 17, 2021

(86) PCT No.: PCT/CN2021/131155
§ 371 (c)(1),
(2) Date: May 15, 2023

(87) PCT Pub. No.: WO2022/105779
PCT Pub. Date: May 27, 2022

(65) Prior Publication Data
US 2024/0013359 A1 Jan. 11, 2024

(30) Foreign Application Priority Data
Nov. 18, 2020 (CN) .......................... 202011298847.4

(51) Int. Cl.
G06T 5/50 (2006.01)
G06T 3/40 (2006.01)
G06V 10/75 (2022.01)

(52) U.S. Cl.
CPC ................. G06T 5/50 (2013.01); G06T 3/40 (2013.01); G06V 10/751 (2022.01); G06T 2207/20221 (2013.01)

(58) Field of Classification Search
CPC ............. G06T 3/40; G06T 2207/20221; G06T 2207/30201; G06T 3/4046; G06T 5/50;
(Continued)

(56) References Cited

U.S. PATENT DOCUMENTS

2021/0118112 A1* 4/2021 Huang ....................... G06T 7/11
2021/0209732 A1* 7/2021 Hu ........................... G06T 7/174
(Continued)

FOREIGN PATENT DOCUMENTS

CN 108921782 A 11/2018
CN 110310229 A 10/2019
(Continued)

OTHER PUBLICATIONS

China National Intellectual Property Administration, Office Action and Search Report Issued in Application No. 202011298847.4, Jul. 20, 2023, 8 pages. (Submitted with English Translation of Comments on Claim 1).
(Continued)

*Primary Examiner* — Kee M Tung
*Assistant Examiner* — Nauman U Ahmad
(74) *Attorney, Agent, or Firm* — Alleman Hall LLP

(57) ABSTRACT

The present disclosure relates to an image processing method and apparatus, a model training method and apparatus, a medium, and a device. The image processing method extracts a first target object image from an image to be processed; inputs the first target object image into a target object image processing model to obtain a second target object image output by the target object image processing model; and performs image fusion according to the second target object image and the image to be processed, so as to obtain a target image.

13 Claims, 3 Drawing Sheets

(58) Field of Classification Search
CPC .. G06V 10/751; G06V 10/454; G06V 10/764;
G06F 18/253; G06N 3/08; G06N 3/088
See application file for complete search history.

(56) References Cited

U.S. PATENT DOCUMENTS

| | | | | |
|---|---|---|---|---|
| 2021/0327028 | A1* | 10/2021 | Machii | G06T 3/4076 |
| 2023/0105139 | A1* | 4/2023 | Cai | G06T 7/74 |
| | | | | 374/121 |
| 2024/0013357 | A1* | 1/2024 | Yabuuchi | G06V 10/454 |

FOREIGN PATENT DOCUMENTS

| | | | |
|---|---|---|---|
| CN | 110428366 | A | 11/2019 |
| CN | 111163265 | A | 5/2020 |
| CN | 111353929 | A | 6/2020 |
| CN | 111626932 | A | 9/2020 |
| CN | 112381717 | A | 2/2021 |

OTHER PUBLICATIONS

ISA China National Intellectual Property Administration, International Search Report and Written Opinion Issued in Application No. PCT/CN2021/131155, Feb. 10, 2022, WIPO, 23 pages.

Fire_Igh, "ESRGAN: Enhanced Super-Resolution Generative Adversarial Networks Paper Notes," CSDN, Available Online at https://blog.csdn.net/weixin_41018348/article/details/82899210, Sep. 29, 2018, 12 pages.

Zuo, Y., "[Image Super-Resolution and Gan] Esrgan translation comprehension and partial code parsing," Zhihu, Available Online at https://zhuanlan.zhihu.com/p/54473407, Last updated on Jan. 11, 2019, 15 pages.

Fourpieces, "The principle of Poisson image fusion (Seamless cloning) and API implementation," CSDN, Available Online at https://blog.csdn.net/Tian_fourpieces/article/details/79762764, Mar. 30, 2018, 16 pages.

Menon, S. et al., "PULSE: Self-Supervised Photo Upsampling via Latent Space Exploration of Generative Models," Proceedings of the 2020 IEEE/CVF Conference on Computer Vision and Pattern Recognition (CVPR), Jun. 13, 2020, Seattle, WA, 20 pages.

* cited by examiner

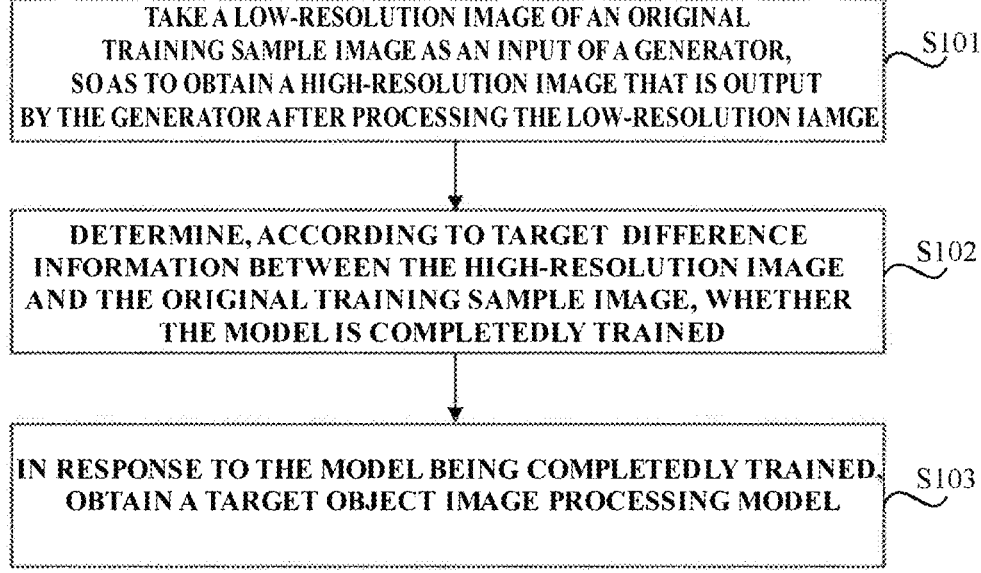

TAKE A LOW-RESOLUTION IMAGE OF AN ORIGINAL
TRAINING SAMPLE IMAGE AS AN INPUT OF A GENERATOR,
SO AS TO OBTAIN A HIGH-RESOLUTION IMAGE THAT IS OUTPUT
BY THE GENERATOR AFTER PROCESSING THE LOW-RESOLUTION IAMGE

S101

DETERMINE, ACCORDING TO TARGET DIFFERENCE
INFORMATION BETWEEN THE HIGH-RESOLUTION IMAGE
AND THE ORIGINAL TRAINING SAMPLE IMAGE, WHETHER
THE MODEL IS COMPLETEDLY TRAINED

S102

IN RESPONSE TO THE MODEL BEING COMPLETEDLY TRAINED,
OBTAIN A TARGET OBJECT IMAGE PROCESSING MODEL

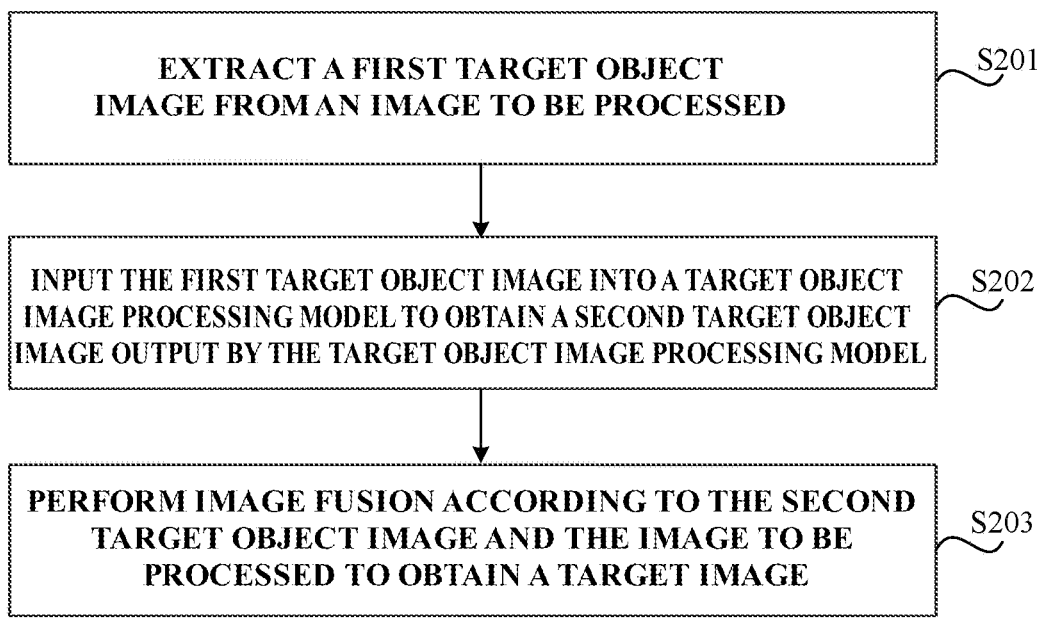

EXTRACT A FIRST TARGET OBJECT IMAGE FROM AN IMAGE TO BE PROCESSED — S201

INPUT THE FIRST TARGET OBJECT IMAGE INTO A TARGET OBJECT IMAGE PROCESSING MODEL TO OBTAIN A SECOND TARGET OBJECT IMAGE OUTPUT BY THE TARGET OBJECT IMAGE PROCESSING MODEL — S202

PERFORM IMAGE FUSION ACCORDING TO THE SECOND TARGET OBJECT IMAGE AND THE IMAGE TO BE PROCESSED TO OBTAIN A TARGET IMAGE — S203

FIG.2

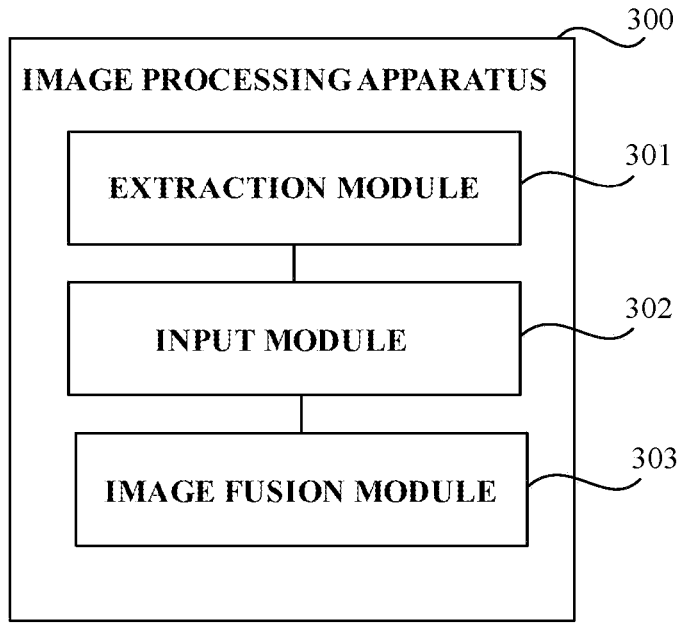

IMAGE PROCESSING APPARATUS — 300

EXTRACTION MODULE — 301

INPUT MODULE — 302

IMAGE FUSION MODULE — 303

FIG.3

IMAGE PROCESSING METHOD, MODEL TRAINING METHOD, APPARATUS, MEDIUM AND DEVICE

CROSS-REFERENCE TO RELATED APPLICATIONS

The present application is a national stage of the International application PCT/CN2021/131155, filed on Nov. 17, 2021, which is based on and claims priority of CN application No. 202011298847.4, filed on Nov. 18, 2020, the disclosure of which is incorporated by reference herein in its entirety.

TECHNICAL FIELD

The present disclosure relates to the field of image processing technology, and in particular, to an image processing method, a model training method, apparatus, medium, and device.

BACKGROUND

The quality of an image is affected by many factors. For example, the image appears blurred, rippled, and densely noisy etc. due to noise, image compression, and other reasons.

SUMMARY

This Summary is provided to introduce concepts in a simplified form that are described in detail in the following Detailed Description section. This Summary section is not intended to identify key features or essential features of the claimed technical solution, nor is it intended to be used to limit the scope of the claimed technical solution.

In a first aspect, the present disclosure provides an image processing method, the method comprising: extracting a first target object image from an image to be processed; inputting the first target object image into a target object image processing model to obtain a second target object image output by the target object image processing model, wherein the resolution of the second target object image is higher than that of the first target object image; and performing images fusion according to the second target object image and the image to be processed, so as to obtain a target image.

Preferably, the target object image processing model is a generative adversarial network model including a generator, and the target object image processing model is trained as follows: using a low-resolution image of an original training sample image as an input to the generator, to obtain a high-resolution image output by the generator after processing the low-resolution image; determining whether the model is completely trained according to target difference information between the high-resolution image and the original training sample image, wherein the target difference information includes at least one of: feature point difference information between the high-resolution image and the original training sample image, and difference information in a specified feature region in the high-resolution image and the original training sample image; and in response to the model being completely trained, obtaining the target object image processing model.

In a second aspect, the present disclosure provides a training method for a target object image processing model, which is a generative adversarial network model including a generator, the method comprising: using a low-resolution image of an original training sample image as an input to the generator, to obtain a high-resolution image output by the generator after processing the low-resolution image; determining whether the model is completely trained according to target difference information between the high-resolution image and the original training sample image, wherein the target difference information includes at least one of: feature point difference information between the high-resolution image and the original training sample image, and difference information in a specified feature region in the high-resolution image and the original training sample image; and in response to the model being completely trained, obtaining the target object image processing model.

In a third aspect, the present disclosure provides an image processing apparatus, the apparatus comprising: an extraction module configured to extract a first target object image from an image to be processed; an input module configured to input the first target object image into a target object image processing model to obtain a second target object image output by the target object image processing model, wherein the resolution of the second target object image is higher than that of the first target object image; an image fusion module configured to perform image fusion according to the second target object image and the image to be processed, so as to obtain a target image.

Preferably, the target object image processing model is a generative adversarial network model including a generator, and the target object image processing model is obtained by training a training apparatus for the target object image processing model, the training apparatus for the target object image processing model comprising: an image obtaining module configured to use a low-resolution image of an original training sample image as an input to the generator, to obtain a high-resolution image output by the generator after processing the low-resolution image; a determination module configured to determine whether the model is completely trained according to target difference information between the high-resolution image and the original training sample image, wherein the target difference information includes at least one of: feature point difference information between the high-resolution image and the original training sample image, and difference information in a specified feature region in the high-resolution image and the original training sample image; and a model obtaining module configured to obtain the target object image processing model in response to the model being completely trained.

In a fourth aspect, the present disclosure provides a training apparatus for a target object image processing model, which is a generative adversarial network model including a generator, the apparatus comprising: an image obtaining module configured to use a low-resolution image of an original training sample image as an input to the generator, to obtain a high-resolution image output by the generator after processing the low-resolution image; a determination module configured to determine whether the model is completely trained according to target difference information between the high-resolution image and the original training sample image, wherein the target difference information includes at least one of: feature point difference information between the high-resolution image and the original training sample image, and difference information in a specified feature region in the high-resolution image and the original training sample image; and a model obtaining module configured to obtain the target object image processing model in response to the model being completely trained.

In a fifth aspect, the present disclosure provides a computer-readable medium having a computer program stored thereon, which, when executed by a processing apparatus, implements the steps of the method provided in the first aspect of the present disclosure.

In a sixth aspect, the present disclosure provides a computer-readable medium having a computer program stored thereon, which, when executed by a processing apparatus, implements the steps of the method provided in the second aspect of the present disclosure.

In a seventh aspect, the present disclosure provides an electronic device, comprising: a storage apparatus having a computer program stored thereon; a processing apparatus configured to execute the computer program in the storage apparatus to implement the steps of the method provided in the first aspect of the present disclosure.

In an eighth aspect, the present disclosure provides an electronic device, comprising: a storage apparatus having a computer program stored thereon; a processing apparatus configured to execute the computer program in the storage apparatus to implement the steps of the method provided in the second aspect of the present disclosure.

With above technical solutions, that is, a first target object image extracted from an image to be processed being input into a target object image processing model to obtain a second target object image with higher resolution, the first target object image in the image to be processed being processed separately, and performing image fusion on the second target object image with higher resolution after processing and the image to be processed to obtain a target image, it can make target objects in the obtained target image clearer and the details more realistic. In the training phase of the target object image processing model, the model is trained through difference information of feature points or difference information of a specified feature region without comparing the entire image, thus the speed of model training is faster, alternatively, the target difference information may include the both at the same time, so that the difference information considered is more comprehensive, thereby the difference between the high-resolution image and the original training sample image can be more accurately characterized according to the target difference information. Training the model according to the target difference information can make the difference between the high-resolution image generated by the generator and the original training sample image smaller, that is, the image is more accurate.

Other features and advantages of the present disclosure will be described in detail in the following Detailed Description section.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the originals and elements are not necessarily drawn to scale. In the drawings:

FIG. 1 is a flowchart of a method for training a target object image processing model according to an exemplary embodiment.

FIG. 2 is a flowchart of an image processing method according to an exemplary embodiment.

FIG. 3 is a block diagram of an image processing apparatus according to an exemplary embodiment.

DETAILED DESCRIPTION

Figure 4:
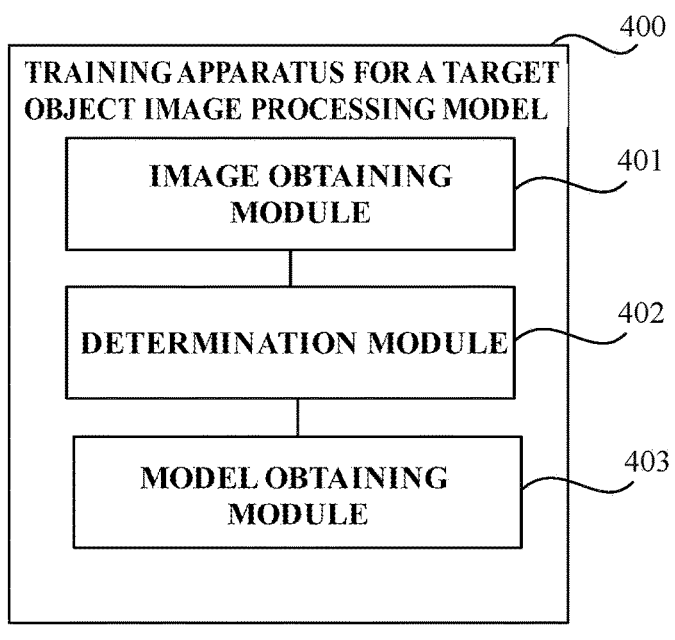
FIG. 4 is a block diagram of a training apparatus for a target object image processing model according to an exemplary embodiment.

Hereinafter, embodiments of the present disclosure will be described in more detail with reference to the accompanying drawings. Although some embodiments of the present disclosure are shown in the drawings, it should be understood that the present disclosure can be implemented in many different forms, which should not be construed as being limited to embodiments set forth herein, rather, these embodiments are provided for a more thorough and complete understanding of the present disclosure. It should be understood that the drawings and embodiments of the present disclosure should be explained as merely illustrative, and not as a limitation to the protection scope of the present disclosure.

It should be understood that various steps recited in the method embodiments of the present disclosure may be executed in a different order, and/or executed in parallel. In addition, the method implementations may include additional steps and/or omit to perform illustrated steps. The scope of the present disclosure is not limited in this respect.

The term "including" and its variants as used herein are open includes, that is, "including but not limited to". The term "based on" means "based at least in part on." The term "one embodiment" means "at least one embodiment"; the term "another embodiment" means "at least one additional embodiment"; the term "some embodiments" means "at least some embodiments." Related definitions of other terms will be given in following description.

It should be noted that the concepts of "first" and "second" etc. mentioned in the present disclosure are only used to distinguish between different apparatus, modules or units, and are not used to limit the order of functions performed by these apparatus, modules or units or their interdependence.

It should be noted that modifiers of "one" and "a plurality of" mentioned in the present disclosure are illustrative and not restrictive, and those skilled in the art should understand that they should be construed as "one or more" unless the context clearly indicates otherwise.

The names of messages or information interacted between a plurality of apparatus in the embodiments of the present disclosure are only used for illustration, and are not used to limit the scope of these messages or information.

The quality of an image is affected by many factors. For example, the image appears blurred, rippled, and densely noisy etc. due to noise, image compression, and other reasons. At present, image restoration and processing are mainly performed manually by technicians. However, manual processing is time-consuming and labor-intensive, especially for the processing of huge amount of image frames in videos or movies, and the efficiency is low. Moreover, current approaches for restoring an image usually process the entire image directly as a whole, thus the processing effect on specific objects in the image is not good.

First, a training method of a target object image processing model in an embodiment of the present disclosure is introduced. A target object can be a person, a human face, a building, a plant, an animal, etc. The present disclosure does not have any specific limitations on the target object. The target object image processing model can be used to perform resolution enhancement processing on images of the target object.

FIG. 1 is a flowchart of a method for training a target object image processing model according to an exemplary embodiment, and the method can be applied to electronic devices with processing capabilities. The target object image processing model can be a generative adversarial network model including a generator, such as an Enhanced Super-Resolution Generative Adversarial Network (ESRGAN), a Super-Resolution Generative Adversarial Network (SR-GAN). As shown in FIG. 1, the method may include S101-S103.

In S101, a low-resolution image of an original training sample image is used as an input to a generator, to obtain a high-resolution image output by the generator after processing the low-resolution image.

Wherein, the original training sample image may be any preset image, and the original training sample image may be a separate image, or an image frame in a video file. In an example, an image including the target object in the image may be used as the original training sample image, for example, if the target object is a human face, an image including the human face may be used as the original training sample image.

The low-resolution image of the original training sample image can be obtained in a variety of ways, for example, down-sampling the original training sample image, or blurring the original training sample image to obtain the corresponding low-resolution image. As to the resolution of the low-resolution image, the present disclosure does not have any specific limitations.

Wherein, the generator in the generative adversarial network model can be used to perform super-resolution processing on an image, that is, to increase the resolution of the image, making the image clearer and more realistic. After the low-resolution image of the original training sample image is input to the generator, the high-resolution image output by the generator after processing can be obtained.

In S102, it is determined whether the model is completely trained according to target difference information between the high-resolution image and the original training sample image.

Wherein, after obtaining the high-resolution image output by the generator, the target difference information between the high-resolution image and the original training sample image can be acquired. In the present disclosure, the target difference information may include at least one of: feature point difference information between the high-resolution image and the original training sample image, and difference information in a specified feature region in the high-resolution image and the original training sample image. The difference information may include, for example, pixel difference information, color difference information, and the like.

Feature points in an image may be key points in the image, and the feature points may be obtained by performing feature point detection on the image. Exemplarily, taking the original training sample image including a human face as an example, the feature points in the image may include key points in the human face. Wherein, the feature points can be extracted from the high-resolution image, and the feature points can be extracted from the original training sample image, so as to determine the feature point difference information between the feature points extracted from the high-resolution image and the feature points extracted from the original training sample image.

A specified feature region in an image may be a characteristic region in the image. For example, if the original training sample image includes a human face, the specified feature regions in the image may be areas such as eyes, mouth, and nose. If the original training sample image includes plants, the specified feature regions in the image can be leaves or flowers. Wherein, the specified feature region may be extracted from the high-resolution image, and the specified feature region may also be extracted from the original training sample image. Taking the human face image as an example, for example, the areas where the eyes are in the images are extracted, and the difference between the two is determined. The difference information is used as the difference information of the specified feature region.

Exemplarily, the target difference information may include feature point difference information or difference information in a specified feature region, and the model is trained with the feature point difference information or the difference information in the specified feature region without comparing the entire image, so the speed of model training is faster. Alternatively, the target difference information may include the both at the same time, so that the difference information considered is more comprehensive, thereby the difference between the high-resolution image and the original training sample image can be more accurately characterized according to the target difference information. Wherein, the generative adversarial network also includes a discriminator configured to distinguish the authenticity of the high-resolution images generated by the generator. Training the generator and the discriminator according to the target difference information can make the difference between the high-resolution image generated by the generator and the original training sample image smaller, that is, the image is more accurate and the image details are more realistic, and the capability for the discriminator to distinguish between true and false can be improved.

In the present disclosure, it may be determined whether the model is completely trained according to the target difference information between the high-resolution image and the original training sample image. Wherein, if the difference between the high-resolution image and the original training sample image is large, it may indicate that the image generated by the generator is not accurate and realistic enough, and the model needs to be trained continuously.

In S103, in response to the model being completely trained, a target object image processing model is obtained.

Conditions for the model being completely trained may include that the difference between the high-resolution image and the original training sample image is small, and the discriminator judges that the high-resolution image generated by the generator is real. At this time, it may characterize that the model is completely trained, and the target object image processing model can be obtained.

If the difference between the high-resolution image and the original training sample image is large, or if the discriminator judges that the high-resolution image is false, it may characterize that the model has not completely trained, and another original training sample image may continue to be acquired, and return to S101, to continue to train the model.

With above technical solutions, according to the target difference information between the high-resolution image and the original training sample image, it is determined whether the model is completely trained, and in response to the model being completely trained, the target object image processing model can be obtained. Wherein, the target difference information may include at least one of: feature point difference information between the high-resolution image and the original training sample image, and difference information in a specified feature region between the high-resolution image and the original training sample image. The model is trained with the feature point difference information or the difference information of the specified feature region without comparing the entire image, thus the speed of model training is faster, alternatively, the target difference information may include the both at the same time, so that the difference information considered is more comprehensive, thereby the difference between the high-resolution image and the original training sample image can be more accurately characterized according to the target difference information. Training the model according to the target difference information can make the difference between the high-resolution image generated by the generator and the original training sample image smaller, that is, the image is more accurate and the image details are more realistic.

In the present disclosure, the target difference information between the high-resolution image and the original training sample image may also include: overall difference information between the high-resolution image adjusted to a preset resolution and the original training sample image adjusted to the preset resolution.

Wherein, after acquiring the high-resolution image generated by the generator, the high-resolution image can be adjusted to the preset resolution, and the original training sample image can also be adjusted to the preset resolution, that is, the resolution of the two can be adjusted to be consistent, and the overall difference information between the two after adjusting is compared. As to the value of the preset resolution, the present disclosure does not have any specific limitations.

In an embodiment, the target difference information in the present disclosure may include at least one of feature point difference information and difference information in a specified feature region, as well as the overall difference information. In this way, the target difference information is more comprehensive. Not only can the model be trained from the perspective of overall difference, but also the model can be trained according the difference information between feature points and/or specified feature regions, so that the high-resolution image generated by the generator is closer to the original training sample image, and the image details are more realistic.

In an implementation, the target object image processing model may further include a discriminator, and the above S102 may include: determining that the model is completely trained if the degree of the difference characterized by each type of difference information included in the target difference information is less than their corresponding difference threshold, and the discriminator judges the authenticity of the high-resolution image is real.

Exemplarily, taking target difference information including overall difference information, feature point difference information, and difference information in a specified feature region as an example, if the degree of the difference characterized by the overall difference information is less than a corresponding first difference degree threshold, the degree of the difference characterized by the feature point difference information is less than a corresponding second difference degree threshold, and the degree of the difference characterized by the difference information of the specified feature region is less than a corresponding third difference degree threshold, the difference between the high-resolution image and the original training sample image is considered to be small, and the high-resolution image generated by the generator is more accurate, and if the discriminator judges that the authenticity of the high-resolution image is real at this time, that is, the discriminator cannot tell the true of false of the high-resolution image generated by the generator, it can be determined that the model is completely trained, that is, the target object image processing model is obtained. Wherein, the first difference degree threshold, the second difference degree threshold and the third difference degree threshold can all be calibrated in advance, and can be the same or different.

If there is difference information in the difference information included in the target difference information whose degree of difference characterized is greater than or equal to the corresponding difference degree threshold, or if the discriminator judges that the authenticity of the high-resolution image is false, it may characterize that the training of the model has not completely trained yet, at this time, another original training sample image can be acquired to continue training the model.

In another implementation, the target object image processing model further includes a discriminator; and the above S102 may include: performing fusion on each type of difference information included in the target difference information to obtain fused difference information; and determining that the model is completely trained if the degree of the difference characterized by the fused difference information is less than a preset fusion difference threshold and the discriminator judges the authenticity of the high-resolution image is real.

Exemplarily, the manner of performing fusion on each type of difference information may be to perform weighting processing on the degree of the difference characterized by each type of difference information, and there is no specific limitation on weights occupied by each type of difference information. If the degree of the difference characterized by the fused difference information is less than a preset fusion difference threshold, it can be characterized that the high-resolution image generated by the generator is more accurate, and at this time, if the discriminator judges that the authenticity of the high-resolution image is real, it can be determined that the model is completely trained, that is, the target object image processing model is obtained.

If the discriminator judges the authenticity of the high-resolution image is false, or the degree of the difference characterized by the fused difference information is greater than or equal to the preset fusion difference threshold, that is, the difference between the high-resolution image and the original training sample image is large, the high-resolution image generated by the generator is not accurate enough, so the model needs continue to be trained.

With above technical solutions, the conditions of whether the model is completely trained may include that the degree of the difference characterized by each type of difference information included in the target difference information is less than their corresponding difference degree thresholds, or that the degree of the difference characterized by the fused difference information is less than the preset fusion difference threshold. In this way, the target difference information may include a variety of difference information between the high-resolution image and the original training sample image, and by training according to the variety of difference information, the obtained target object image processing model can be more accurate.

The present disclosure further provides an image processing method. FIG. 2 is a flowchart of an image processing method according to an exemplary embodiment. As shown in FIG. 2, the image processing method may include S201-S203.

In S201, a first target object image is extracted from an image to be processed.

Wherein, the image to be processed can be a pre-stored image, or an image captured by a user in real time, and the image to be processed may also be an image frame in a video file. If the image to be processed is an image frame of a video file, multiple image frames in the video can be processed respectively.

The first target object image may be an image of a target object detected from the image to be processed. For example, if the target object is a human face, the first target object image may be an extracted human face image. For another example, if the target object is a building, the first target object image may be an extracted building image.

In S202, the first target object image is input into a target object image processing model to obtain a second target object image output by the target object image processing model. Wherein, the resolution of the second target object image is higher than that of the first target object image.

After the first target object image is extracted from the image to be processed, the first target object image can be input into the target object image processing model, which can be used to perform resolution enhancement processing on the first target object image, and output the second target object image with higher resolution and higher definition.

Wherein, the target object image processing model is a generative adversarial network model including a generator, and the target object image processing model can be obtained through training as shown in FIG. 1: in S101, a low-resolution image of an original training sample image is used as an input to the generator, to obtain a high-resolution image output by the generator after processing the low-resolution image. In S102, it is determined whether the model is completely trained according to target difference information between the high-resolution image and the original training sample image, wherein the target difference information may include at least one of: feature point difference information between the high-resolution image and the original training sample image, and difference information in a specified feature region in the high-resolution image and the original training sample image. In S103, in response to the model being completely trained, the target object image processing model is obtained.

Wherein, the specific training process of the target object image processing model has been described in detail hereinabove, and will not be repeated here.

In S203, image fusion is performed according to the second target object image and the image to be processed to obtain a target image.

A target object can be a key part, that is, a relatively prominent part, in the image to be processed. In this disclosure, the first target object image in the image to be processed being processed separately, and then performing image fusion on the processed second target object image with higher resolution and the image to be processed can make the target object in the obtained target image clearer, and improve the problem that the target object is not clear caused by directly processing the entire image of the image to be processed.

In an embodiment, the image to be processed may be an image frame in a video, and each image frame in the video may be processed separately, so that a video file with higher resolution and higher definition may be obtained.

With above technical solutions, that is, a first target object image extracted from an image to be processed being input into a target object image processing model to obtain a second target object image with higher resolution, the first target object image in the image to be processed being processed separately, and performing image fusion on the second target object image with higher resolution after processing and the image to be processed to obtain a target image, it can make target objects in the obtained target image clearer and the details more realistic. In the training phase of the target object image processing model, the model is trained through difference information of feature points or difference information of a specified feature region without comparing the entire image, thus the speed of model training is faster, alternatively, the target difference information may include the both at the same time, so that the difference information considered is more comprehensive, thereby the difference between the high-resolution image and the original training sample image can be more accurately characterized according to the target difference information. Training the model according to the target difference information can make the difference between the high-resolution image generated by the generator and the original training sample image smaller, that is, the image is more accurate.

In an optional embodiment, performing image fusion according to the second target object image and the image to be processed to obtain a target image in S203 may include: performing resolution enhancement processing on the image to be processed to obtain a target image to be processed; and performing image fusion according to the second target object image and the target image to be processed to obtain the target image.

Wherein, there may be a variety of ways of performing resolution enhancement processing on the image to be processed. Exemplarily, the image to be processed may be input into an image processing model to obtain a target image to be processed output by the image processing model. The image processing model may be different from the target object image processing model described above, and the image processing model may be any network model used to perform full-image processing on the image to be processed, that is, to increase the resolution of the image to be processed. As another example, the image to be processed may be up-sampled to obtain a target image to be processed with a higher resolution.

After obtaining the target image to be processed with a higher resolution, image fusion can be performed on the second target object image after processed by the target object image processing model and the target image to be processed, thereby obtaining the target image, which has higher resolution, and the details of the target object in the image are more realistic. Exemplarily, Poisson fusion may be used as an image fusion method, and the Poisson fusion method may make edge transitions of fusion parts more natural.

Based on the same inventive concept, the present disclosure further provides an image processing apparatus. FIG. 3 is a block diagram of an image processing apparatus according to an exemplary embodiment. As shown in FIG. 3, the image processing apparatus 300 may include:

an extraction module 301 configured to extract a first target object image from an image to be processed;

an input module 302 configured to input the first target object image into a target object image processing model to obtain a second target object image output by the target object image processing model, wherein the resolution of the second target object image is higher than that of the first target object image;

an image fusion module 303 configured to perform image fusion according to the second target object image and the image to be processed, so as to obtain a target image;

Wherein, the target object image processing model is a generative adversarial network model including a generator, and the target object image processing model can be obtained by training a training apparatus 400 for the target object image processing model shown in FIG. 4, as shown in FIG. 4, the training apparatus 400 for the target object image processing model may include:

An image obtaining module 401 configured to use the low-resolution image of the original training sample image as the input to the generator, to obtain a high-resolution image output by the generator after processing the low-resolution image;

a determination module 402 configured to determine whether the model is completely trained according to target difference information between the high-resolution image and the original training sample image, wherein the target difference information includes at least one of: feature point difference information between the high-resolution image and the original training sample image, and difference information in a specified feature region in the high-resolution image and the original training sample image; and a model obtaining module 403 configured to obtain the target object image processing model in response to the model being completely trained.

With above technical solutions, that is, a first target object image extracted from an image to be processed being input into a target object image processing model to obtain a second target object image with higher resolution, the first target object image in the image to be processed being processed separately, and performing image fusion on the second target object image with higher resolution after processing and the image to be processed to obtain a target image, it can make target objects in the obtained target image clearer and the details more realistic. In the training phase of the target object image processing model, the model is trained through difference information of feature points or difference information of a specified feature region without comparing the entire image, thus the speed of model training is faster, alternatively, the target difference information may include the both at the same time, so that the difference information considered is more comprehensive, thereby the difference between the high-resolution image and the original training sample image can be more accurately characterized according to the target difference information. Training the model according to the target difference information can make the difference between the high-resolution image generated by the generator and the original training sample image smaller, that is, the image is more accurate.

Optionally, the image fusion module 303 may include: a resolution enhancement processing submodule configured to perform resolution enhancement processing on an image to be processed to obtain a target image to be processed; and an image fusion submodule configured to perform image fusion according to the second target object image and the target image to be processed to obtain the target image.

FIG. 4 is a block diagram of a training apparatus for a target object image processing model according to an exemplary embodiment. The target object image processing model is a generative adversarial network model including a generator. The apparatus 400 may include:

an image obtaining module 401 configured to use a low-resolution image of an original training sample image as an input to the generator, to obtain a high-resolution image output by the generator after processing the low-resolution image;

a determination module 402 configured to determine whether the model is completely trained according to target difference information between the high-resolution image and the original training sample image, wherein the target difference information includes at least one of: feature point difference information between the high-resolution image and the original training sample image, and difference information in a specified feature region in the high-resolution image and the original training sample image;

a model obtaining module 403 configured to obtain the target object image processing model in response to the model being completely trained.

Optionally, the target difference information further includes overall difference information between the high-resolution image adjusted to a preset resolution and the original training sample image adjusted to the preset resolution.

Optionally, the target object image processing model further includes a discriminator; the determination module 402 may include: a first determination submodule configured to determine that the model is completely trained if the degree of the difference characterized by each type of difference information included in the target difference information is less than their corresponding difference thresholds, and the discriminator judges the authenticity of the high-resolution image is real.

Optionally, the target object image processing model further includes a discriminator; the determination module 402 may include: a fusion submodule configured to perform fusion on each type of difference information included in the target difference information to obtain fused difference information; and a second determination submodule configured to determine that the model is completely trained if the degree of the difference characterized by the fused difference information is less than a preset fusion difference threshold and the discriminator judges the authenticity of the high-resolution image is real.

With regard to the apparatus in the above embodiments, the specific manner in which each module executes operations has been described in detail in the embodiments of the method, and will not be described in detail here.

Figure 5:
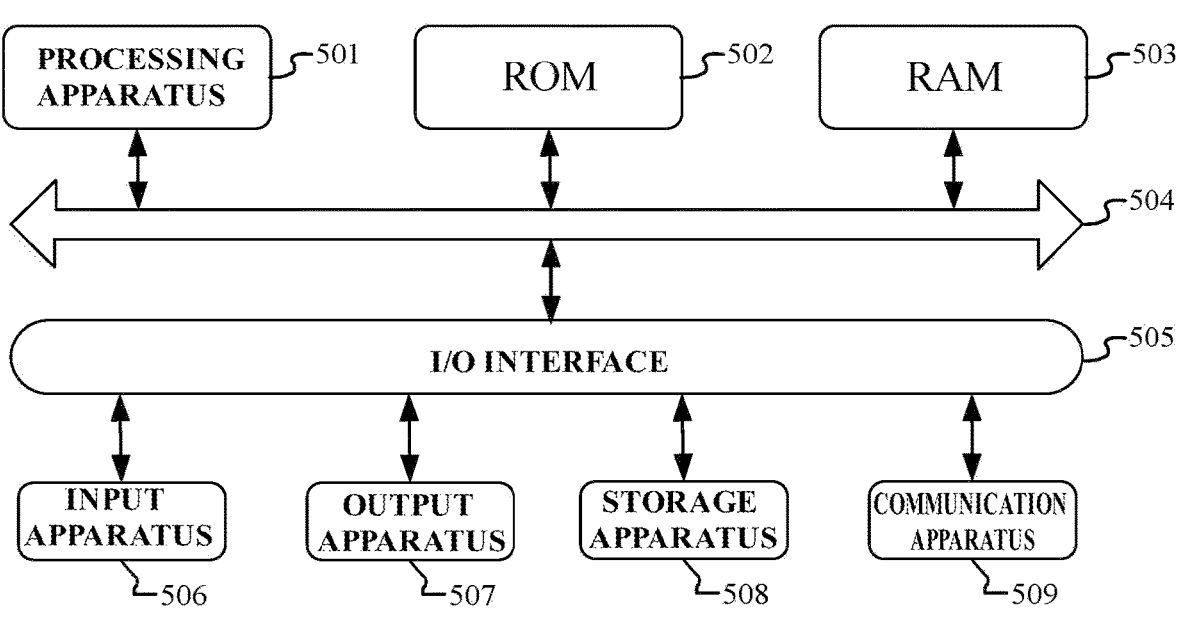
FIG. 5 is a schematic structural diagram of an electronic device according to an exemplary embodiment.

Referring to FIG. 5 below, it shows a schematic structural diagram of an electronic device 500 suitable for implementing an embodiment of the present disclosure. The terminal device in the embodiment of the present disclosure may include but not limited to a mobile terminal such as a mobile phone, a notebook, a digital broadcast receiver, a PDA (Personal Digital Assistant), a PAD (tablet), a PMP (Portable Multimedia Player), a vehicle-mounted terminal (for example, a vehicle-mounted navigation terminal), etc. and a fixed terminal such as a digital TV, a desktop computer, etc. The electronic device shown in FIG. 5 is only one example, and should not bring any limitation to functions and usage scopes of embodiments of the present disclosure.

As shown in FIG. 5, the electronic device 500 may include a processing apparatus (for example, a central processing unit, a graphics processing unit, etc.) 501, which can execute various appropriate actions and processes according to a program stored in a read-only memory (ROM) 502 or a program loaded from a storage 508 into a random-access memory (RAM) 503. In the RAM 503, various programs and data required for the operation of the electronic device 500 are also stored. The processing apparatus 501, ROM 502, and RAM 503 are connected to each other through a bus 504. An input/output (I/O) interface 505 is also connected to the bus 504.

Generally, the following apparatus can be connected to the I/O interface 505: an input device 506 including for example, a touch screen, a touch pad, a keyboard, a mouse, a camera, a microphone, an accelerometer, a gyroscope, etc.; an output device 507 including for example, a liquid crystal display (LCD), a speaker, a vibrator, etc.; a storage 508 including for example, a magnetic tape, a hard disk, etc.; and a communication apparatus 509. The communication apparatus 509 may allow the electronic device 500 to perform wireless or wired communication with other devices to exchange data. Although FIG. 5 shows an electronic device 500 having various apparatus, it should be understood that it is not required to implement or have all of the illustrated apparatus. It can alternatively be implemented or provided with more or fewer apparatus.

In particular, according to an embodiment of the present disclosure, the process described above with reference to the flowchart can be implemented as a computer software program. For example, an embodiment of the present disclosure includes a computer program product, which includes a computer program carried on a non-transitory computer readable medium, and the computer program contains program code for executing the method shown in the flowchart. In such an embodiment, the computer program may be downloaded and installed from the network through the communication apparatus 509, or installed from the storage 508, or installed from the ROM 502. When the computer program is executed by the processing apparatus 501, above functions defined in the methods of the embodiments of the present disclosure are executed.

It should be noted that above computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, in which a computer-readable program code is carried. This propagated data signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some implementations, the client and the server can communicate using any currently known or future-developed network protocols, such as HTTP (HyperText Transfer Protocol), and can interconnect with digital data communication (for example, communication network) in any form or medium. Examples of communication networks include local area networks ("LAN"), wide area networks ("WAN"), international network (for example, the Internet), and end-to-end networks (for example, ad hoc end-to-end networks), as well as any currently known or future developed networks.

The above computer-readable medium may be included in above electronic devices; or it may exist alone without being assembled into the electronic device.

The above computer-readable medium carries one or more programs, which, when executed by the electronic device, cause the electronic device: to extract a first target object image from an image to be processed; to input the first target object image into a target object image processing model to obtain a second target object image output by the target object image processing model, wherein the resolution of the second target object image is higher than that of the first target object image; and to perform images fusion according to the second target object image and the image to be processed, so as to obtain a target image; wherein, the target object image processing model is a generative adversarial network model including a generator, and the target object image processing model is trained as follows: using a low-resolution image of an original training sample image as an input to the generator, to obtain a high-resolution image output by the generator after processing the low-resolution image; determining whether the model is completely trained according to target difference information between the high-resolution image and the original training sample image, wherein the target difference information includes at least one of: feature point difference information between the high-resolution image and the original training sample image, and difference information in a specified feature region in the high-resolution image and the original training sample image; and in response to the model being completely trained, obtaining the target object image processing model.

Alternatively, the above computer-readable medium carries one or more programs, which, when executed by the electronic device, cause the electronic device: to use a low-resolution image of an original training sample image as an input to the generator, to obtain a high-resolution image output by the generator after processing the low-resolution image; to determine whether the model is completely trained according to target difference information between the high-resolution image and the original training sample image, wherein the target difference information includes at least one of: feature point difference information between the high-resolution image and the original training sample image, and difference information in a specified feature region in the high-resolution image and the original training sample image; and in response to the model being completely trained, to obtain the target object image processing model.

The computer program code for performing the operations of the present disclosure can be written in one or more programming languages or a combination thereof. The above programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and operation implementations of a system, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The modules involved in the embodiments of the present disclosure can be implemented in software or hardware. Wherein, the name of the module does not constitute a limitation on the module itself under certain circumstances. For example, the extraction module may also be described as a "target object image extraction module".

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, Example 1 provides an image processing method, the method comprising: extracting a first target object image from an image to be processed; inputting the first target object image into a target object image processing model to obtain a second target object image output by the target object image processing model, wherein the resolution of the second target object image is higher than that of the first target object image; and performing images fusion according to the second target object image and the image to be processed, so as to obtain a target image; wherein, the target object image processing model is a generative adversarial network model including a generator, and the target object image processing model is trained as follows: using a low-resolution image of an original training sample image as an input to the generator, to obtain a high-resolution image output by the generator after processing the low-resolution image; determining whether the model is completely trained according to target difference information between the high-resolution image and the original training sample image, wherein the target difference information includes at least one of: feature point difference information between the high-resolution image and the original training sample image, and difference information in a specified feature region in the high-resolution image and the original training sample image; and in response to the model being completely trained, obtaining the target object image processing model.

According to one or more embodiments of the present disclosure, Example 2 provides the method of Example 1, the target difference information further includes overall difference information between the high-resolution image adjusted to a preset resolution and the original training sample image adjusted to the preset resolution.

According to one or more embodiments of the present disclosure, Example 3 provides the method of Example 1, the target object image processing model further includes a discriminator; the determining whether the model is completely trained according to target difference information between the high-resolution image and the original training sample image includes: determining that the model is completely trained if the degree of the difference characterized by each type of difference information included in the target difference information is less than their corresponding difference threshold, and the discriminator judges the authenticity of the high-resolution image is real.

According to one or more embodiments of the present disclosure, Example 4 provides the method of Example 1, the target object image processing model further includes a discriminator; the determining whether the model is completely trained according to target difference information between the high-resolution image and the original training sample image includes: fusing each type of difference information included in the target difference information to obtain fused difference information; determining that the model is completely trained if the degree of the difference characterized by the fused difference information is less than a preset fusion difference threshold and the discriminator judges the authenticity of the high-resolution image is real.

According to one or more embodiments of the present disclosure, Example 5 provides the method described in any one of Examples 1-4, the performing images fusion according to the second target object image and the image to be processed so as to obtain a target image includes: performing resolution enhancement processing on the image to be processed to obtain a target image to be processed; and performing image fusion according to the second target object image and the target image to be processed to obtain the target image.

According to one or more embodiments of the present disclosure, Example 6 provides a training method for a target object image processing model, which is a generative adversarial network model including a generator, the method comprising: using a low-resolution image of an original training sample image as an input to the generator, to obtain a high-resolution image output by the generator after processing the low-resolution image; determining whether the model is completely trained according to target difference information between the high-resolution image and the original training sample image, wherein the target difference information includes at least one of: feature point difference information between the high-resolution image and the original training sample image, and difference information in a specified feature region in the high-resolution image and the original training sample image; and in response to the model being completely trained, obtaining the target object image processing model.

According to one or more embodiments of the present disclosure, Example 7 provides the method of Example 6, the target difference information further includes overall difference information between the high-resolution image adjusted to a preset resolution and the original training sample image adjusted to the preset resolution.

According to one or more embodiments of the present disclosure, Example 8 provides the method of Example 6, the target object image processing model further includes a discriminator; the determining whether the model is completely trained according to target difference information between the high-resolution image and the original training sample image includes: determining that the model is completely trained if the degree of the difference characterized by each type of difference information included in the target difference information is less than their corresponding difference threshold, and the discriminator judges the authenticity of the high-resolution image is real.

According to one or more embodiments of the present disclosure, Example 9 provides the method of Example 6, the target object image processing model further includes a discriminator; the determining whether the model is completely trained according to target difference information between the high-resolution image and the original training sample image includes: fusing each type of difference information included in the target difference information to obtain fused difference information; and determining that the model is completely trained if the degree of the difference characterized by the fused difference information is less than a preset fusion difference threshold and the discriminator judges the authenticity of the high-resolution image is real.

According to one or more embodiments of the present disclosure, Example 10 provides an image processing apparatus, the apparatus comprising: an extraction module configured to extract a first target object image from an image to be processed; an input module configured to input the first target object image into a target object image processing model to obtain a second target object image output by the target object image processing model, wherein the resolution of the second target object image is higher than that of the first target object image; and an image fusion module configured to perform image fusion according to the second target object image and the image to be processed, so as to obtain a target image; wherein, the target object image processing model is a generative adversarial network model including a generator, and the target object image processing model is obtained by training a training apparatus for the target object image processing model, the training apparatus for the target object image processing model comprising: an image obtaining module configured to use a low-resolution image of an original training sample image as an input to the generator, to obtain a high-resolution image output by the generator after processing the low-resolution image; a determination module configured to determine whether the model is completely trained according to target difference information between the high-resolution image and the original training sample image, wherein the target difference information includes at least one of: feature point difference information between the high-resolution image and the original training sample image, and difference information in a specified feature region in the high-resolution image and the original training sample image; and a model obtaining module configured to obtain the target object image processing model in response to the model being completely trained.

According to one or more embodiments of the present disclosure, Example 11 provides a training apparatus for a target object image processing model, which is a generative adversarial network model including a generator, the apparatus comprising: an image obtaining module configured to use a low-resolution image of an original training sample image as an input to the generator, to obtain a high-resolution image output by the generator after processing the low-resolution image; a determination module configured to determine whether the model is completely trained according to target difference information between the high-resolution image and the original training sample image, wherein the target difference information includes at least one of: feature point difference information between the high-resolution image and the original training sample image, and difference information in a specified feature region in the high-resolution image and the original training sample image; and a model obtaining module configured to obtain the target object image processing model in response to the model being completely trained.

According to one or more embodiments of the present disclosure, Example 12 provides a non-transitory computer-readable medium having a computer program stored thereon, which, when executed by a processing apparatus, implements the steps of any one of the methods described in Examples 1-5.

According to one or more embodiments of the present disclosure, Example 13 provides a non-transitory computer-readable medium having a computer program stored thereon, which, when executed by a processing apparatus, implements the steps of any one of the methods described in Examples 6-9.

According to one or more embodiments of the present disclosure, Example 14 provides an electronic device, comprising: a storage apparatus having a computer program stored thereon; a processing apparatus configured to execute the computer program in the storage apparatus, to implement the steps of any one of the methods described in Examples 1-5.

According to one or more embodiments of the present disclosure, Example 15 provides an electronic device, comprising: a storage apparatus having a computer program stored thereon; a processing apparatus configured to execute the computer program in the storage apparatus, to implement the steps of any one of the methods described in Examples 6-9.

The above description is only preferred embodiments of the present disclosure and an explanation to the technical principles applied. Those skilled in the art should understand that the scope of disclosure involved in this disclosure is not limited to technical solutions formed by specific combination of above technical features, and should also cover other technical solutions formed by arbitrarily combining above technical features or equivalent features thereof without departing from above disclosed concept. For example, those technical solutions formed by exchanging of above features and technical features disclosed in the present disclosure (but not limited to) having similar functions with each other.

In addition, although various operations are depicted in a specific order, this should not be understood as requiring these operations to be performed in the specific order shown or performed in a sequential order. Under certain circumstances, multitasking and parallel processing may be advantageous. Likewise, although several specific implementation details are included in above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in a language specific to structural features and/or logical actions of the method, it should be understood that the subject matter defined in the appended claims is not necessarily limited to the specific features or actions described above. Rather, the specific features and actions described above are merely exemplary forms of implementing the claims. Regarding the apparatus in the above embodiments, the specific manner in which each module performs operations has been described in detail in the method embodiments, which will not be described in detail here.

What is claimed is:

1. An image processing method, the method comprises:
extracting a first target object image from an image to be processed;
inputting the first target object image into a target object image processing model to obtain a second target object image output by the target object image processing model, wherein a resolution of the second target object image is higher than that of the first target object image; and
performing image fusion according to the second target object image and the image to be processed, so as to obtain a target image,
wherein the target object image processing model further includes a discriminator; and
determining whether the target object image processing model is completely trained according to target difference information between a high-resolution image and an original training sample image includes:
    fusing each type of difference information included in the target difference information to obtain fused difference information; and
    determining that the target object image processing model is completely trained if a degree of a difference characterized by the fused difference information is less than a preset fusion difference threshold and the discriminator judges an authenticity of the high-resolution image is real.

2. The method according to claim 1, wherein the target difference information further includes overall difference information between the high-resolution image adjusted to a preset resolution and the original training sample image adjusted to the preset resolution.

3. The method according to claim 1, wherein
the determining whether the target object image processing model is completely trained according to target difference information between the high-resolution image and the original training sample image includes:
determining that the target object image processing model is completely trained if a degree of a difference characterized by each type of difference information included in the target difference information is less than their corresponding difference threshold, and the discriminator judges an authenticity of the high-resolution image is real.

4. The method according to claim 1, wherein the performing image fusion according to the second target object image and the image to be processed so as to obtain the target image includes:
performing resolution enhancement processing on the image to be processed to obtain the target image to be processed; and
performing image fusion according to the second target object image and the target image to be processed to obtain the target image.

5. The method according to claim 1,
wherein the target object image processing model is a generative adversarial network model including a generator, and the target object image processing model is trained by:
using a low-resolution image of an original training sample image as an input to the generator, to obtain the high-resolution image output by the generator after processing the low-resolution image;
determining whether the target object image processing model is completely trained according to the target difference information between the high-resolution image and the original training sample image, wherein the target difference information includes at least one of: feature point difference information between the high-resolution image and the original training sample image, and difference information in a specified feature region in the high-resolution image and the original training sample image; and
in response to the target object image processing model being completely trained, obtaining the target object image processing model.

6. A training method for a target object image processing model, wherein the method comprises:
using a low-resolution image of an original training sample image as an input to a generator, to obtain a high-resolution image output by the generator after processing the low-resolution image, wherein the target object image processing model is a generative adversarial network model including the generator;
determining whether the target object image processing model is completely trained according to target difference information between the high-resolution image and the original training sample image, wherein the target difference information includes at least one of: feature point difference information between the high-resolution image and the original training sample image, and difference information in a specified feature region in the high-resolution image and the original training sample image; and in response to the target object image processing model being completely trained, obtaining the target object image processing model, wherein the target object image processing model further comprises a discriminator; and the determining whether the target object image processing model is completely trained according to target difference information between the high-resolution image and the original training sample image includes:

fusing each type of difference information included in the target difference information to obtain fused difference information; and determining that the target object image processing model is completely trained if a degree of a difference characterized by the fused difference information is less than a preset fusion difference threshold and the discriminator judges an authenticity of the high-resolution image is real.

7. The method according to claim 6, wherein the target difference information further includes overall difference information between the high-resolution image adjusted to a preset resolution and the original training sample image adjusted to the preset resolution.

8. The method according to claim 6, wherein the determining whether the target object image processing model is completely trained according to target difference information between the high-resolution image and the original training sample image includes:

determining that the target object image processing model is completely trained if a degree of the difference characterized by each type of difference information included in the target difference information is less than their corresponding difference threshold, and the discriminator judges an authenticity of the high-resolution image is real.

9. An electronic device comprising:

a storage apparatus having a computer program stored thereon;

a processing apparatus configured to execute the computer program in the storage apparatus to implement an image processing method, the method comprises:

extracting a first target object image from an image to be processed;

inputting the first target object image into a target object image processing model to obtain a second target object image output by the target object image processing model, wherein a resolution of the second target object image is higher than that of the first target object image; and performing image fusion according to the second target object image and the image to be processed, so as to obtain a target image, wherein the target object image processing model further includes a discriminator;

determining whether the target object image processing model is completely trained according to target difference information between a high-resolution image and an original training sample image includes:

fusing each type of difference information included in the target difference information to obtain fused difference information; and determining that the target object image processing model is completely trained if a degree of a difference characterized by the fused difference information is less than a preset fusion difference threshold and the discriminator judges an authenticity of the high-resolution image is real.

10. The device according to claim 9, wherein the target difference information further includes overall difference information between the high-resolution image adjusted to a preset resolution and the original training sample image adjusted to the preset resolution.

11. The device according to claim 9, wherein the determining whether the target object image processing model is completely trained according to target difference information between the high-resolution image and the original training sample image includes:

determining that the target object image processing model is completely trained if a degree of a difference characterized by each type of difference information included in the target difference information is less than their corresponding difference threshold, and the discriminator judges an authenticity of the high-resolution image is real.

12. The device according to claim 9, wherein the performing image fusion according to the second target object image and the image to be processed so as to obtain the target image includes:

performing resolution enhancement processing on the image to be processed to obtain the target image to be processed; and performing image fusion according to the second target object image and the target image to be processed to obtain the target image.

13. The device according to claim 9, wherein the target object image processing model is a generative adversarial network model including a generator, and the target object image processing model is trained by:

using a low-resolution image of an original training sample image as an input to the generator, to obtain the high-resolution image output by the generator after processing the low-resolution image;

determining whether the target object image processing model is completely trained according to the target difference information between the high-resolution image and the original training sample image, wherein the target difference information includes at least one of: feature point difference information between the high-resolution image and the original training sample image, and difference information in a specified feature region in the high-resolution image and the original training sample image; and in response to the target object image processing model being completely trained, obtaining the target object image processing model.

* * * * *